F. M. ALLERTON.
Horse Hay Rake.
No. 92,140.                        Patented July 6, 1869.
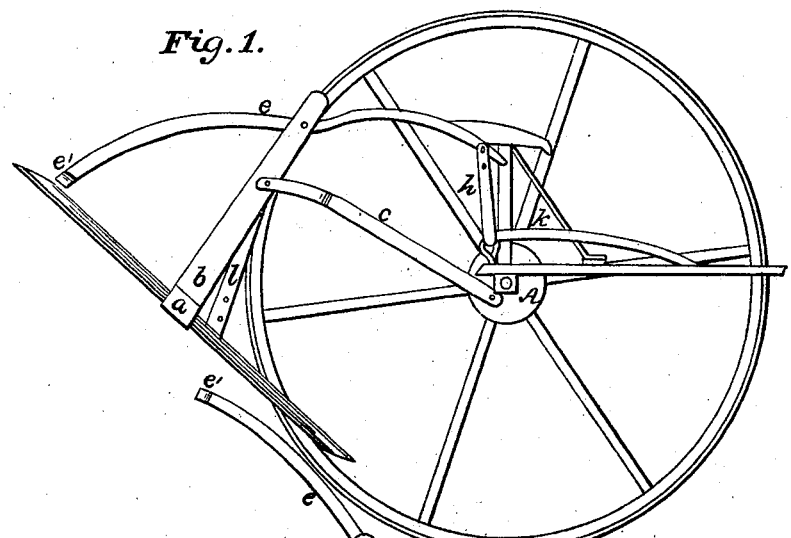
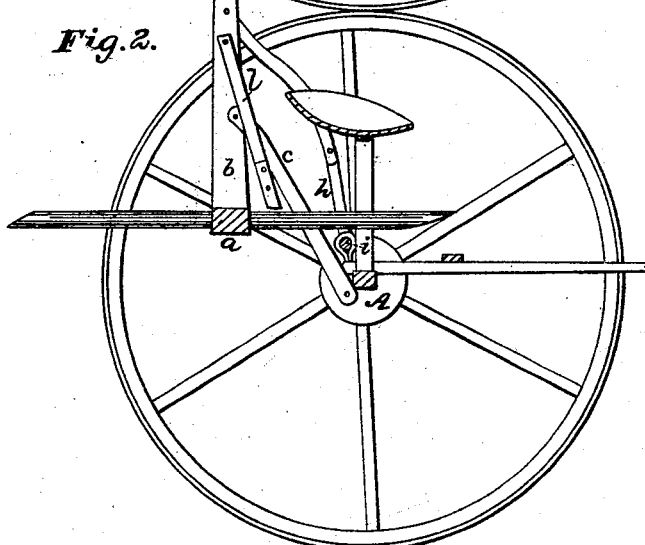
Witnesses:                        Inventor:

United States Patent Office.

FRANCIS M. ALLERTON, OF ALLIANCE, OHIO.

Letters Patent No. 92,140, dated July 6, 1869.

IMPROVEMENT IN HORSE-RAKES.

The Schedule referred to in these Letters Patent and making part of the same.

*To all whom it may concern:*

Be it known that I, FRANCIS M. ALLERTON, of Alliance, in the State of Ohio, have invented a new and useful Improvement in Horse-Rakes; and I do hereby declare that the following is a full, clear, and exact description of the same, reference being had to the accompanying drawings and letters of reference marked thereon, making a part of this specification, in which—

Figure 1 is an end elevation, showing the rake ready for use, and

Figure 2, a longitudinal vertical section, showing the rake stowed away for transportation.

To enable those skilled in the art to make and use my invention, I now proceed to describe its construction and operation.

Similar letters in the drawings refer to like parts.

This invention relates to the species of horse-rake, known as "revolving;" and

It consists in part of an arrangement of levers that operate the stops by which the rake-head is prevented from revolving until the proper moment, and in part of an arrangement of levers and connecting-rods for enabling the rake-head to be lifted up and stowed away above the axle, when it is to be transported from place to place.

In the drawings, is shown an ordinary wooden rake-head, to the beam $a$, of which, are pivoted, in the usual manner, two wooden bars $b\ b$.

To each of the bars $b$, about at its centre, is pivoted one end of a metallic rod, $c$, which may be forked, while the opposite end of the same, which may also be forked, is pivoted to the axle A.

The free ends of the bars $b$ have slots in them to receive the arms $e$, which are pivoted about at their centres in said slots, and have at their rear ends stops $e'$, against which bear the front sides of some of the teeth in the upper half of the rake-head, while the lower half is gathering up the crop, which lower half is prevented from yielding before the pressure of its load by the stops $e'$.

The front ends of the arms $e$ are pivoted to the extremities of arms $h$, which project from a shaft, $i$, placed in suitable bearings upon the axle.

Another arm, $k$, projects from the shaft $i$, at a point between the arms $h$ convenient to the driver's seat, and about at right angles to the arms $h$.

To get the apparatus into shape for use, press the lever $k$ down to a level with the thills. The lever $k$ being connected with the rake-head, through the medium of the mechanism above described, the said rake-head is raised to the proper elevation by the depression of the lever, and the teeth may be turned so as to collect the crop when the team starts. The same depression of the lever $k$ brings the stops $e'$ into position to prevent the rake-head from revolving. When the rake-head requires turning, raise the arm $k$. This movement depresses the outer ends of the arms $h$, and the inner ends of the arms $e$, and raises the outer ends of the arms $e$, with the stops $e'$, clear of the rake-head, so that the latter may revolve. When the rake-head is partly turned, I depress the lever $k$ once more.

To stow the rake-head away upon the axle, depress the lever $k$ so as to bring all the parts as high as possible. The rake-head is then to be turned horizontal, or nearly so, and carried upward and inward in a circular path, being supported during this movement by the rods $c$, and the teeth run under the seat above the shaft $i$, until the rods $c$ assume a nearly vertical position.

The rake-head is held thus by the driver's seat, and by hangers $l$ which depend from the inner sides of the bars $b$, and being elastic, may each be sprung over a tooth so as to prevent the rake-head from turning.

What I claim as new, and desire to secure by Letters Patent, is—

1. In combination with the rake-head, the arms $e$ with their stops $e'$, and the shaft $i$ with its arms $h$, the whole operating as and for the purpose described.

2. In combination with the rake-head, the bars $b$, shaft $i$, lever $k$, hinged bars $c$, and arms $e$, the whole operating substantially as described.

To the above, I have signed my name, this 31st day of March, 1869.

FRANCIS M. ALLERTON.

Witnesses:
JOSEPH BARNABY,
JOHN ALLERTON.